Patented May 29, 1928.

1,671,834

UNITED STATES PATENT OFFICE.

DAVID McNICOLL, OF KINGSTON-UPON-HULL, ENGLAND, ASSIGNOR TO THE BRITISH OIL AND CAKE MILLS LIMITED, OF KINGSTON-UPON-HULL, ENGLAND, A COMPANY OF GREAT BRITAIN.

TREATMENT OF CRUDE COTTONSEED OIL.

No Drawing. Application filed January 12, 1925, Serial No. 1,990, and in Great Britain February 6, 1924.

This invention relates to the removal of colouring matter from crude cotton seed oils, and it has for its object, improvements in the treatment of such oils whereby colouring matter contained therein can be precipitated and removed without removing or affecting to any material extent the free fatty acids in the oils.

As is well known, the colour of crude cotton seed oils varies from a reddish yellow to a reddish black according to the quality of the seed, its origin, and the method of obtaining the oil from the seed.

The colour of the oil is mainly due to the presence in varying amount of a colouring matter, known as gossypol, and of its oxidation products.

From experiments I have conducted, I have found that gossypol possesses the property of forming compounds with borates of the metals which compounds are insoluble in water and in oil, and that by making use of this property the greater portion of the colouring matter can be removed from crude cotton seed oil without the neutralization of the free fatty acids contained therein.

This I attain by the use of a solution containing a metallic borate and so much free or combined boric acid that the solution shows an acid reaction towards phenolphthalein, or, alternatively, by the use of a metallic borate which in aqueous solution reacts alkaline towards phenolphthalein with the addition of material known to reduce the hydroxyl ion concentration, and preferably in such quantity that the solution is no longer alkaline. Some of such substances probably from complex ions and thus reduce hydroxyl ion concentration, but the effect is the same as if they repressed the alkaline hydrolysis.

The solution must contain sufficient borate to precipitate gossypol from the oil.

The repression of hydrolysis may be effected in the known manner (a) by the addition of either or both of the ionic products of hydrolysis, i. e. the borate ion and the metallic ion, e. g. by means of boric acid on the one hand and on the other hand by means of a metallic chloride or other neutral metallic salt, or (b) by the addition of glycerol, mannitol or other polyhydric alcohol, or (c) by a combination of the substances indicated under (a) and (b).

In particular, I have found that the most effective solutions for attaining the object before mentioned are obtained by the addition of boric acid to an alkali borate or magnesium borate solution in such quantity as to discharge completely the red colour which such borate solutions show in the presence of phenolphthalein, or alternatively by the direct addition of a carbonate or a hydroxide of an alkali metal or of magnesium to a boric acid solution in an amount insufficient to produce a pink colour in the presence of phenolphthalein. Furthermore, the solutions should be such as to show an acid reaction towards this indicator when heated to the temperature at which the process is conducted.

By the use of a borate solution of this nature, the greater part of the colouring matter of crude cotton seed oil may be removed without an inappreciable neutralization of free fatty acids. The colouring matter thus removed is mainly unoxidized gossypol and the amount present in a cotton seed oil is estimated by treating with an excess of acid borate solution.

If, after removal of the precipitated colouring matter by filtration or sedimentation, the acid value of the oil is not reduced by a second treatment with acid borate solution, then gossypol is shown to have been completely removed, and the reduction in the acid value of the oil is a measure of the amount of gossypol originally present.

The method or process of removing the colouring matter from the oils by means of my solutions is similar to the methods usually employed in refining cotton seed oils by means of an alkali, and agitation for a period of about fifteen minutes usually suffices to complete the reaction.

The precipitated colouring matter is then found to be suspended throughout the oil.

It is advisable to operate with a weak borate solution, e. g. whose total boric acid content is less than 10% in order to diminish the loss of chemicals resulting from the absorption of the solution by the precipitated colouring matter and also to add a soluble non-reacting salt such as sodium chloride for a borax solution, or magnesium chloride for a solution of megnesium borate, for the purpose of facilitating a rapid and perfect separation of the oil layer from the aqueous suspension of the precipitated colouring matter.

The colouring matter separated therefrom, can be used as a substitute for logwood, cutch, fustic and the like.

Although crude cotton seed oils of inferior quality may, even after being subjected to treatment in accordance with my invention, be somewhat dark in colour, such oils only contain an extremely small quantity of colouring matter, and this is easily destroyed or removed by any of the known means for the purpose.

The following are five examples of the method of employing the most effective solutions in accordance with my invention:—

*Example 1.*—I heat 1,000 parts of crude cotton seed oil in an open vessel to 60° C. and thereto, either previous to agitation or whilst in a state of agitation, I add an aqueous solution of 100 parts containing 5 parts of borax, 5 parts of boric acid and 10 parts of sodium chloride. After agitation for a period of 10 to 15 minutes, the mixture is allowed to settle. The clear or only slightly turbid oil is drawn off, the aqueous layer is then centrifuged to separate the suspended colouring matter from any entangled oil and to recover the borate solution which may be used over again after the addition of the requisite amount of borax.

*Example 2.*—I dissolve in 100 parts of water, 10 parts of magnesium chloride, 5 parts of boric acid and 5 parts of magnesium borate and add this solution to 1,000 parts of crude cotton seed oil and proceed thereafter as described in Example 1.

*Example 3.*—I dissolve in 100 parts of water, 10 parts of the sodium pentaborate having the formula $Na_2O,5B_2O_3,10 H_2O$, and 10 parts of sodium chloride, and add this solution to 1,000 parts of crude cotton seed oil, and proceed thereafter as described in Example 1.

*Example 4.*—I dissolve in 100 parts of water, 5 parts of borax and 12 parts of glycerine and add this solution to 1000 parts of crude cotton seed oil and proceed thereafter as described in Example 1.

*Example 5.*—I dissolve in 100 parts of water, 5 parts of borax and 6 parts of mannitol and add this solution to 1000 parts of crude cotton seed oil and proceed thereafter as described in Example 1.

I am aware that the use of soluble borates has been proposed for the purification of oils, but such soluble borates as are commercially known, shown an alkaline reaction in equeous solution towards phenolphthalein, consequently in the process of purification of oils with such solutions, free fatty acids are removed to an extent determined by the amount of alkaline hydrolysis.

Moreover, the matter thus removed in the case of cotton oil can only be converted into black grease which is of little value.

The agents I employ, by preference, in accordance with my invention show an acid reaction in equeous solution towards phenolphthalein and effect the removal of colouring matter without affecting the free fatty acids. Further, the oil absorbed by the precipitated colouring matter may be recovered by extraction with an oil solvent, and the extracted residue may then be used as a valuable dyestuff.

Such a result cannot possibly be obtained by the use of any hitherto-known process, and herein lies the value of my invention.

Having thus described my invention, what I claim as new and desire to secure by Letters Patent is:—

1. The step in the process of refining crude cotton seed oil, which comprises treating such oil with an aqueous solution having an acid reaction towards phenolphthalein at the temperature of treatment and containing so much of a borate that colouring matter is precipitated without substantial neutralization of free fatty acid present in such oil, and subsequently allowing the whole to settle, whereby the oil is separated from the colouring matter and borate solution.

2. The process of refining crude cotton seed oil which includes the step of treating such oil with an aqueous solution containing sufficient of a borate to precipitate gossypol from the oil and containing an added substance which largely reduces the hydroxyl ion concentration below the concentration normally possessed by said borate solution, whereby colouring matter is precipitated without substantial neutralization of fatty acid present in said oil.

In testimony whereof, I have signed my name to this specification at Kingston-upon-Hull, England, this 2nd day of January, 1925.

DAVID McNICOLL.